July 11, 1961     L. R. HETZLER ET AL     2,992,382
REGULATING CIRCUIT FOR GENERATORS
Filed Dec. 15, 1958
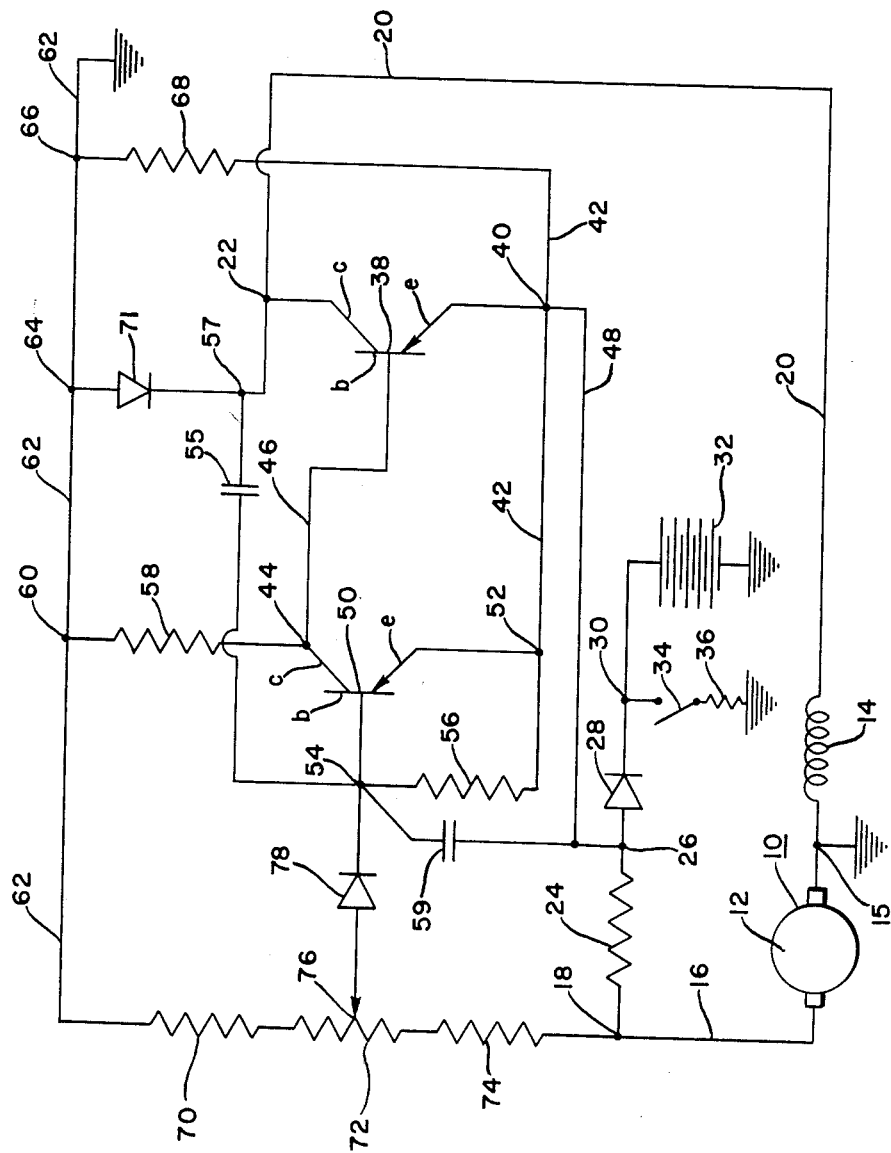
INVENTORS
Lewis R. Hetzler
Leonard J. Sheldrake
BY
Their Attorney ed States Patent Office 2,992,382
Patented July 11, 1961

2,992,382
REGULATING CIRCUIT FOR GENERATORS
Lewis R. Hetzler and Leonard J. Sheldrake, Anderson, Ind., assignors to General Motors Corporation, Detroit, Mich., a corporation of Delaware
Filed Dec. 15, 1958, Ser. No. 780,519
8 Claims. (Cl. 322—25)

This invention relates to vehicle electrical circuits and more particularly to vehicle electrical systems that include a voltage regulating circuit and a rectifier connected between a power source and a battery for preventing reverse current flow between the battery and power source.

In motor vehicle electrical systems it has been found desirable in many instances to replace the conventional cut-out relay of the system with a rectifier that is connected between a D.C. power source and a battery to prevent reverse current flow between the battery and power source during the time that the power source is idle or when the output voltage of the source is below battery voltage. The rectifier may be of the pn junction semi-conductor type which operates satisfactorily in the system. When such a system is used, however, a part of the voltage of the power source available to charge the battery is dropped across the rectifier and this reduces the voltage applied to the battery to an undesirable level.

It is, accordingly, an obect of this invention to provide a vehicle electrical circuit that includes a voltage regulator and a rectifier connected between a power source and the battery and wherein means are provided for compensating for the voltage drop across the rectifier.

A more specific object of this invention is to provide a vehicle electrical circuit that includes a voltage regulator, a power source and a battery, there being a rectifier connected between the power source and the battery and wherein a resistor is connected in one of the lines of the power source which develops a voltage drop that is subtracted from the voltage applied to the voltage sensing circuit of the regulator to indicate to the regulator an apparent decrease in the voltage sensed. In this way the regulator causes an increase in the voltage output of the power source to compensate for the voltage drop across the rectifier.

Still another object of this invention is to provide a voltage regulating circuit for a vehicle electrical system that includes one or more transistors for controlling the voltage output of the power source and wherein a rectifier is connected between the power source and a storage battery to prevent reverse current flow between the battery and power source, the circuit including means for compensating for the voltage drop across the rectifier.

Further objects and advantages of the present invention will be apparent from the following description, reference being had to the accompanying drawings wherein preferred embodiments of the present invention are clearly shown.

In the drawings:

The single figure drawing is a schematic illustration of a regulating circuit made in accordance with this invention.

Referring now to the drawing, the power source of this invention in this case takes the form of a direct current generator 10 having an armature 12 and a field winding 14. One side of the armature 12 is connected directly to ground via junction 15 whereas the opposite side of the armature is connected with a lead 16 that is in turn connected with junction 18. The field winding 14 of the generator has one side thereof connected to ground via junction 15 and has its opposite side connected with a lead 20 which is in turn connected with a junction 22. It will be appreciated that in motor vehicle installations the armature 12 will be driven by the engine of the vehicle.

The junction 18 is connected with a resistor 24, the opposite end of which is connected with junction 26. A pn junction semi-conductor rectifier designated by reference numeral 28 is connected between junctions 26 and 30. The rectifier may be of the silicon type well known to those skilled in the art and is ideally suited for this installation as it has a low forward voltage drop. The junction 30 is connected with one side of a storage battery 32 and also is connected to one side of a switch 34. The opposite sides of the storage battery and switch are connected through to ground as shown so that current is supplied from junction 30 to the storage battery and to an electrical load designated by reference numeral 36. The switch 34 controls the energization of the electrical load 36 and this load may represent the normal electrical loads used on motor vehicles and the like. The load circuit for the vehicle may then by traced from the armature 12 of the D.C. generator through lead wire 16, through resistor 24 and through pn junction rectifier 28 to the storage battery and to the electrical load 36. It will be appreciated that the rectifier 28 prevents reverse current flow between battery 32 toward the power source 10.

The voltage regulator circuit for controlling the voltage output of the power source includes a first transistor designated by reference numeral 38 having a base electrode $b$, an emitter electrode $e$ and a collector electrode $c$. The collector electrode of transistor 38 is connected with junction 22 and thus is connected with lead wire 20. The emitter electrode of transistor 38 is connected with a junction 40 which is in turn connected with lead 42. The base electrode $b$ of transistor 38 is connected with junction 44 via a lead 46. The junctions 26 and 40 are connected together by a lead 48.

A second transistor 50 is provided which has a base electrode $b$, a collector electrode $c$ and an emitter electrode $e$. The emitter electrode of transistor 50 is connected with junction 52 and is thus connected with lead 42. The base electrode $b$ of transistor 50 is connected with junction 54 whereas the collector electrode of transistor 50 is connected with junction 44. A condenser 55 is connected between junctions 54 and 57 and a second condenser 59 is connected between junctions 54 and 26. A resistor 56 connects the junctions 52 and 54 as clearly illustrated in the drawing. A resistor 58 is connected between junction 44 and a junction 60 which is connected to lead 62. The lead 62 forms a common connection for junctions 60, 64 and 66. This lead is connected directly to ground as is shown and is at a negative polarity. A resistor 68 is connected between junctions 40 and 66 and a rectifier 71 is connected between junctions 22 and 64.

A voltage dividing network is connected between junction 18 and lead wire 62 and includes resistors 70, 72 and 74. The resistor 72 is tapped as at 76 and this tap point may be varied to change the voltage setting of the regulating circuit. A Zener diode 78 is connected between junction 76 and junction 54. The Zener diode as is well known to those skilled in the art, has the characteristic of preventing reverse current flow therethrough when certain voltages below a predetermined value are applied thereacross. When a predetermined voltage is reached, however, the diode breaks down in a reverse direction and permits current flow therethrough. When the diode is conducting current in a reverse direction it has a constant voltage characteristic so that changes in current flow therethrough provide substantially no change in the voltage drop across the Zener diode.

It will be readily apparent to those skilled in the art that the field current through field winding 14 will be controlled as a function of the conductance from emitter to collector of transistor 38. Thus the field current for field winding 14 flows from armature 12, through lead 16, through resistor 24, through lead 48, through the emitter to collector path of transistor 38, through lead 20 thence through field winding 14 to ground.

The conductance of transistor 38 is controlled by the conduction of transistor 50 and its conductance is in turn controlled by the voltage appearing between junctions 26 and 76. Thus, assuming that the Zener diode is being operated at a point where it is conducting current in a reverse direction the base current flowing through the diode from junction 52 to junction 76 will be controlled as a function of the voltage appearing between junctions 26 and 76. As the potential difference between junction 26 and 76 increases the conduction from emitter to base of transistor 50 increases with a consequent increase in the conduction from emitter to collector of transistor 50. With transistor 50 conducting, the transistor 38 will be substantially non-conductive as the transistor 50 will shunt current away from the transistor 38. Thus, with an increase in potential difference between junctions 26 and 76 the transistor 50 becomes substantially fully conductive and the transistor 38 substantially fully non-conductive from emitter to collector. This reduces the field current through field winding 14 to reduce the output voltage of the D.-C. power source.

When the voltage between junctions 26 and 76 is decreasing the conduction of transistor 50 is decreased, which brings about an increase in the conduction of transistor 38. The increase of current flow from emitter to collector of transistor 38 brings about an increase in current flow through field winding 14 to increase the voltage output of the D.-C. power source to bring the voltage back to a desired regulated value.

It can be seen from the foregoing that the transistors 38 and 50 operate oppositely in that when transistor 50 is substantially fully conductive transistor 38 becomes substantially fully non-conductive and vice versa. It will also be readily apparent that the conduction of the transistor 50 is controlled by the voltage appearing between junctions 26 and 76 which is applied to a voltage sensing circuit of the voltage regulator. This sensing circuit includes the junctions 40 and 76 which sense the voltage appearing between junctions 26 and 76. From the foregoing it will be readily apparent that when the voltage between junctions 26 and 76 increases the current flow through field winding 14 is decreased and vice versa.

The resistor 24 is a compensating resistor which increases the voltage output of the D.-C. power source to compensate for the voltage drop across rectifier 28. Thus, the voltage drop across resistor 24 subtracts from the voltage drop across junctions 18 and 76. If resistor 24 were not provided the voltage appearing across junctions 26 and 76 would be the voltage drop across resistor 74 and the lower part of resistor 72 up to the tap point 76. With resistor 24 connected in the circuit as shown, however, the voltage appearing between junctions 26 and 76 is reduced by the amount of the voltage drop across resistor 24 so that the voltage regulating circuit senses an apparent decrease in load voltage. By sensing the apparent decrease in load voltage the regulating circuit increases the voltage output of the D.-C. power source. This slight increase in voltage compensates for the voltage lost across pn junction rectifier 28. It will be apparent from the foregoing that the voltage regulating circuit is controlled by the difference in voltage of the voltage drops appearing between junctions 18 and 76, and 18 and 26. It will also be readily apparent that the voltage drop between junctions 18 and 76 is proportional to load circuit voltage whereas the voltage drop across resistor 24 is proportional to load current being supplied to the battery 32 and electrical load 36.

With the circuit just described the voltage available to charge battery 32 is not dropped to an undesirable low level by the rectifier 28 as the resistor 24 compensates for this voltage drop.

While the embodiments of the present invention as herein disclosed, constitute a preferred form, it is to be understood that other forms might be adopted.

What is claimed is as follows:

1. In a battery charging circuit, the combination comprising, a source of direct current power having a control winding for controlling the voltage output of the source as a function of current flow therethrough, a storage battery connected in circuit with said power source to be charged thereby, a rectifier connected between said power source and storage battery for preventing current flow from said battery toward said power source, voltage regulating means connected in circuit with said power source, a sensing circuit for said voltage regulating means conneced in circuit with said power source, means for applying a first voltage to said sensing circuit that is proportional to the output voltage of the said power source, and means for decreasing the apparent voltage sensed by said circuit to increase the output voltage of the said power source to thereby compensate for the voltage drop across said rectifier.

2. In a battery charging circuit, the combination comprising, a direct current generator having a field winding for controlling the voltage output of said generator as a function of current flow therethrough, a load circuit connected to be energized from said generator, a storage battery connected with said load circuit, a rectifier connected between said generator and said storage battery for preventing current flow from said battery toward said generator means for controlling the voltage output of said generator including a transistor connected in circuit with said generator and field winding, an electric circuit for controlling the conduction of said transistor, means for deriving a first voltage that is proportional to the output voltage of said power source, means for deriving a second voltage that is proportional to load current, and means for applying the difference of said first and second voltages to said electric circuit.

3. In a battery charging circuit, the combination comprising, a D.C. generator having a field winding for controlling the output of said generator as a function of current flow therethrough, a load circuit including a storage battery connecting to be energized by said generator, a rectifier connected between said generator and storage battery for preventing current flow from said battery toward said generator, voltage regulating means connected with said generator and said field winding for controlling the current flow through said winding as a function of the output voltage of said generator, a voltage sensing circuit for said voltage regulating means, means for deriving a voltage that is proportional to the output voltage of said power source, means for deriving a second voltage that is proportional to load current including a resistor connected in series with said rectifier, and means for applying the difference of said first and second voltages to said voltage sensing circuit.

4. In a battery charging circuit, the combination comprising, a D.C. generator having a field winding for controlling the output voltage of said generator as a function of current flow therethrough, a load circuit connected to be energized from said generator, a storage battery connected with said load circuit, a rectifier connected between said generator and said battery for preventing current flow from said battery toward said generator, voltage regulating means connected with said generator and with said field winding for controlling the voltage output of said power source, means for deriving a first voltage that is proportional to the output voltage of said power source including a circuit element having resistance connected directly across said generator, means for deriving a second voltage that is proportional to load current including a second resistor connected in series with said rectifier, and means for applying the difference of said first and second voltages to said voltage regulating means.

5. In a battery charging circuit, the combination comprising, a generator having a field winding for controlling the voltage output of said generator as a function of current flow therethrough, a load circuit connected to be energized from said generator, a storage battery connected with said load circuit, a pn junction semiconductor rectifier connected between said generator and said storage battery for preventing current flow from said storage battery toward said generator, voltage regulating means for controlling the voltage output of said generator connected in circuit with said control winding and said generator, means for deriving a first voltage that is proportional to the output voltage of said generator, means for deriving a second voltage that is proportional to output current of said generator, and means for applying the difference of said first and second voltages to said voltage regulating circuit.

6. In combination, a direct current generator having a field winding for controlling the voltage output of said generator as a function of current flow therethrough, a direct current load circuit connected to be energized by said generator, a storage battery connected with said load circuit to be charged thereby, a rectifier connected between said generator and said battery and poled in such a direction as to prevent current flow from said battery toward said generator while permitting current flow between said generator and battery, means including voltage sensing means connected with said load circuit for varying the current flow through said control winding as a function of voltage appearing across said load circuit, and means for applying a voltage to said voltage sensing means of such a polarity as to cause said sensing means to sense an apparent decrease in load voltage whereby the voltage output of said generator is increased to compensate for the voltage drop across said rectifier.

7. In a battery charging circuit, the combination comprising, a direct current generator having a field winding, a load circuit connected to be energized from said generator, a storage battery connected with said load circuit, a pn junction semi-conductor rectifier connected between said generator and said storage battery for preventing current flow from said storage battery toward said power source, voltage regulating means including a transistor connected in circuit with said generator and field winding for controlling the voltage output of said generator, a control circuit for controlling the conduction of said transistor including a Zener diode, means for deriving a first voltage that is proportional to the output voltage of said generator including a voltage dividing network connected directly across the output terminals of the generator, means for deriving a second voltage that is proportional to the current passing through said rectifier, and means for applying the difference of said first and second voltages to said control circuit whereby said generator has an output voltage which is increased a sufficient amount over that necessary to charge the battery to compensate for the voltage drop across said rectifier.

8. In a battery charging circuit, the combination comprising, a direct current generator having a field winding, a storage battery connected with said generator to be charged thereby, a rectifier connected between said generator and said storage battery for preventing current flow from said storage battery toward said generator, a first transistor having an emitter-collector circuit connected with the output terminals of the generator and with said generator field for controlling the current flow therethrough, a second transistor controlling the conduction of said first transistor, a voltage dividing network connected directly across the output terminals of the generator, a Zener diode connected between said voltage dividing network and the base electrode of said second transistor, and a resistor connected in series with said generator and with said voltage dividing network, the voltage drops across said resistor and at least a portion of said voltage dividing network being operative to control the conduction of said second transistor with the voltage drop across the resistor tending to cause an increase in the output voltage of the generator by an amount sufficient to compensate for the voltage drop across said rectifier.

References Cited in the file of this patent

UNITED STATES PATENTS

| | | |
|---|---|---|
| 2,809,301 | Short | Oct. 8, 1957 |
| 2,850,695 | Bishop | Sept. 2, 1958 |
| 2,892,143 | Sommer | June 23, 1959 |

Notice of Adverse Decision in Interference

In Interference No. 92,960 involving Patent No. 2,992,382, L. R. Hetzler and L. J. Sheldrake, Regulating circuit for generators, final decision adverse to the patentees was rendered Sept. 30, 1963, as to claims 1, 2, 3, 4, 5, 6, 7 and 8.

[*Official Gazette November 12, 1963.*]